(12) United States Patent
Finnance

(10) Patent No.: US 11,344,157 B2
(45) Date of Patent: May 31, 2022

(54) BLENDER AND FOOD PROCESSOR COMBINATION WITH SAFETY FEATURES

(71) Applicant: Capbran Holdings, LLC, Los Angeles, CA (US)

(72) Inventor: Robert Finnance, Los Angeles, CA (US)

(73) Assignee: Capbran Holdings, LLC, Los Angeles, CA (US)

(*) Notice: Subject to any disclaimer, the term of this patent is extended or adjusted under 35 U.S.C. 154(b) by 221 days.

(21) Appl. No.: 16/890,806

(22) Filed: Jun. 2, 2020

(65) Prior Publication Data

US 2021/0345829 A1    Nov. 11, 2021

Related U.S. Application Data

(60) Provisional application No. 63/022,230, filed on May 8, 2020.

(51) Int. Cl.
| | |
|---|---|
| *A47J 43/00* | (2006.01) |
| *A47J 43/046* | (2006.01) |
| *A47J 43/08* | (2006.01) |
| *A47J 43/07* | (2006.01) |

(52) U.S. Cl.
CPC ......... *A47J 43/046* (2013.01); *A47J 43/0722* (2013.01); *A47J 43/0761* (2013.01); *A47J 43/085* (2013.01)

(58) Field of Classification Search
CPC .. A47J 43/046; A47J 43/0761; A47J 43/0722; A47J 43/085
See application file for complete search history.

(56) References Cited

U.S. PATENT DOCUMENTS

2019/0117013 A1*    4/2019    Kim .................... A47J 43/08

* cited by examiner

*Primary Examiner* — Anshu Bhatia
(74) *Attorney, Agent, or Firm* — Trojan Law Offices

(57) ABSTRACT

An appliance operable in a first configuration as a blender and in a second configuration as a food processor, with safety mechanisms that work for both configurations. In the blender configuration, the appliance has safety mechanisms in a blade attachment that function to prevent the motor from operating unless the blade attachment is properly secured to the motor base and a blender container is properly secured to the blade attachment. In the food processor configuration, the appliance has safety mechanisms that function to prevent the motor from operating unless a food processor container is properly secured to the motor base and a lid is properly secured to the food processor container.

13 Claims, 17 Drawing Sheets

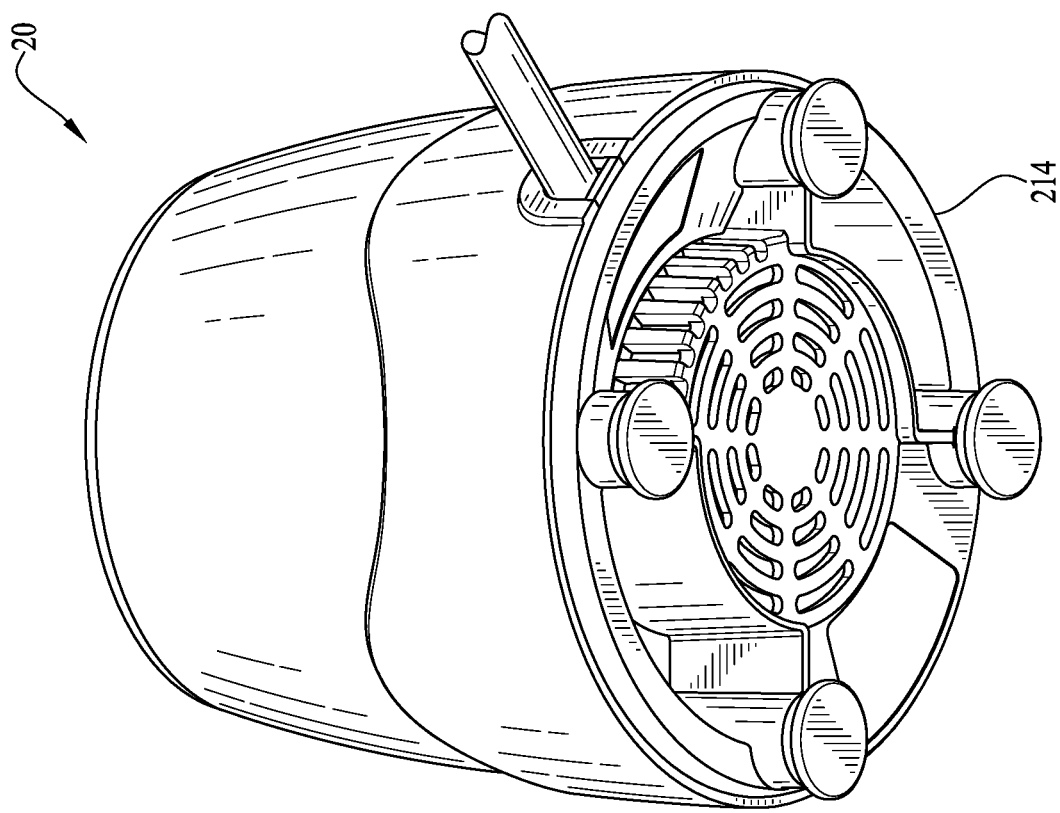
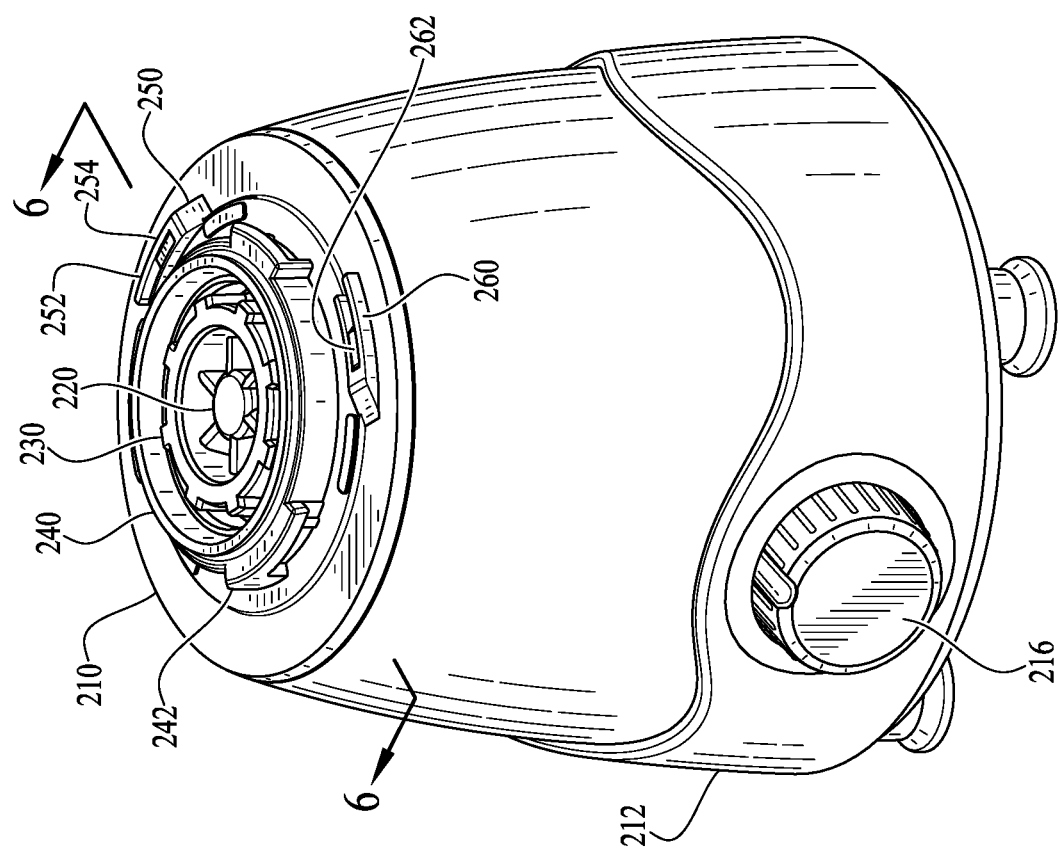

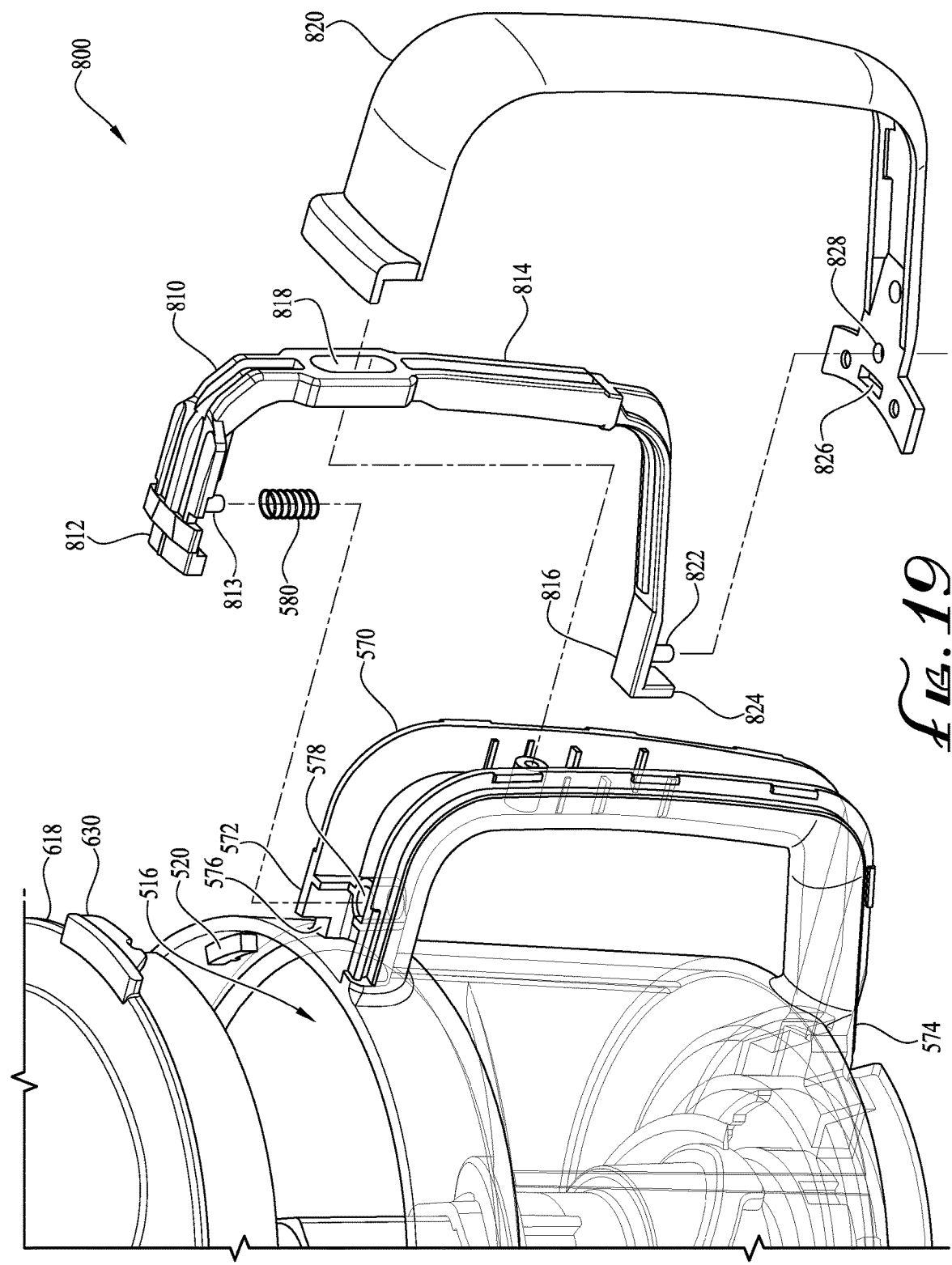

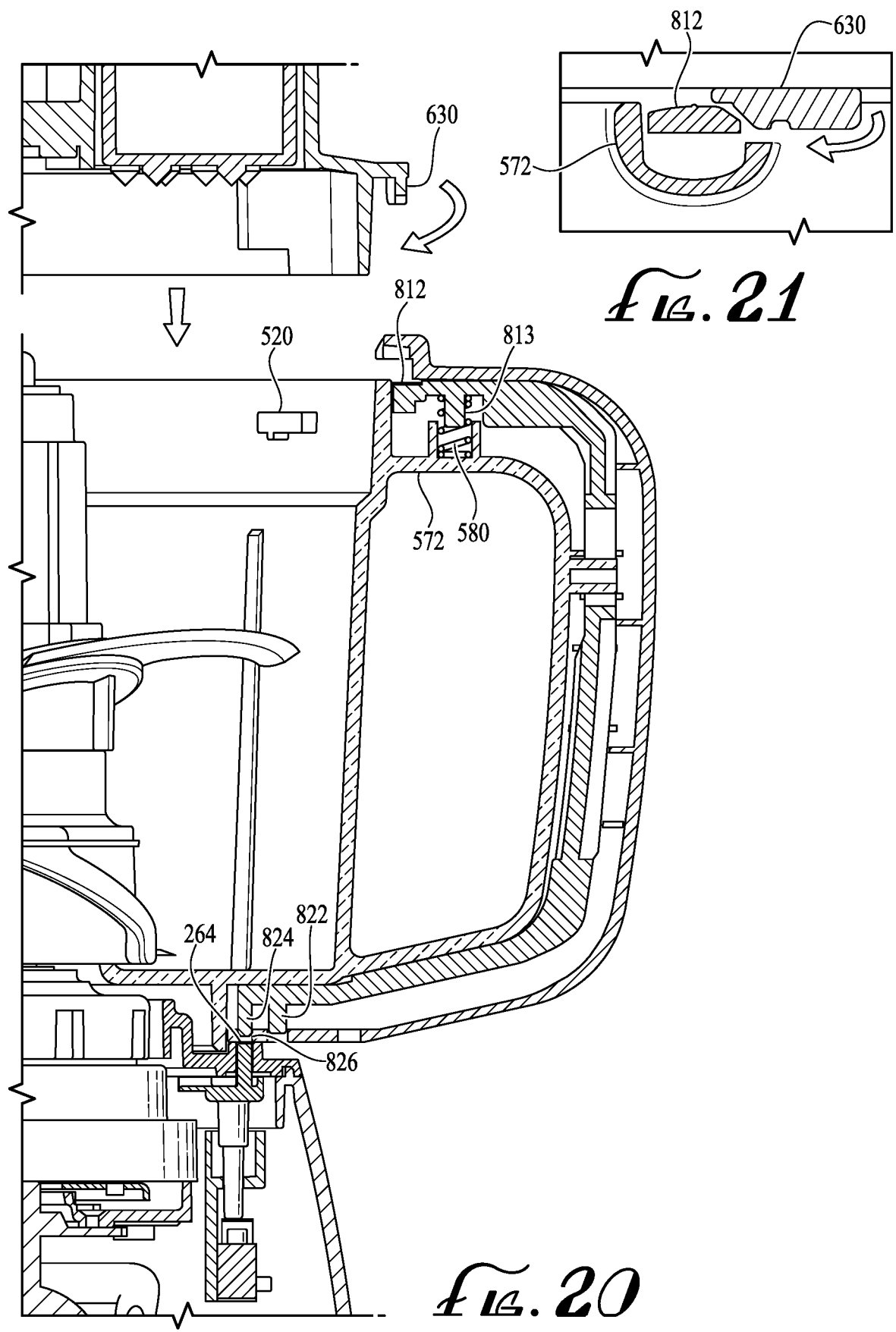

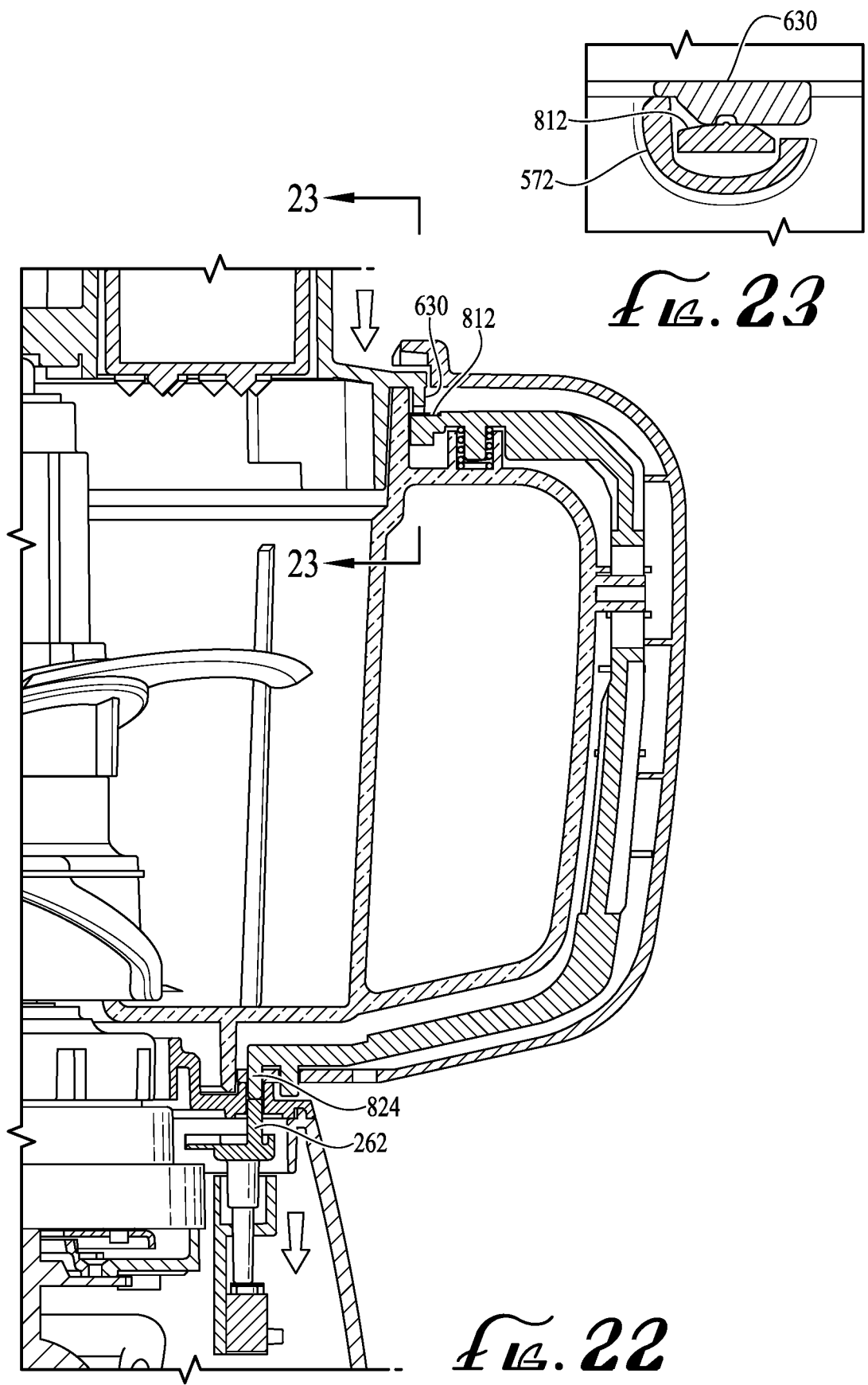

BLENDER AND FOOD PROCESSOR COMBINATION WITH SAFETY FEATURES

CROSS REFERENCE TO RELATED APPLICATION

This application claims priority to and benefit of U.S. Provisional Patent Application No. 63/022,230, filed on May 8, 2020, the content of which is incorporated by reference in its entirety.

FIELD OF THE INVENTION

The present invention relates to kitchen appliances. In particular, the present invention relates to a food processor and blender combination having safety features.

BACKGROUND OF THE INVENTION

Kitchen appliances such as food processors and blenders are well known. Though blenders can be similar to food processors in some form, blenders and food processors are generally used for different purposes and thus employ different operations. For example, a food processor is generally used to blend, chop, dice, and slice solid foodstuff, often requiring little or no liquid to perform the processing. While a blender is generally used to mix, purée, or emulsify soft foodstuff, such as fruit, often requiring liquid and/or ice to make drinks such as shakes or smoothies.

Since blenders and food processors are used for different purposes and employ different operations, they generally have different components with differing configurations.

For example, a typical "upright" blender is generally comprised of a motor base and a container having an integrated blade attachment. The motor base contains a motor for turning the blade attachment to perform different processing operations. The container, which has an opening at the top covered by a lid, is mounted upright on the motor base with the opening oriented upwards. To operate a typical upright blender, comestible material is deposited in the container through the top opening, then closed with the lid, and the comestible material is processed by selecting a desired operation using controls typically located on the motor base.

Another kind of blender are "inverted" blenders, which are generally comprised of a motor base and a container, with a separate blade attachment that is not integrated with the container. Unlike upright blenders, the blade attachment is attached to the opening of the container, then the container and blade attachment combination are inverted to mount on the base. To operate a typical inverted blender, comestible material is deposited into the container, then the blade attachment is attached to close the container, and then the container and the blade attachment are mounted to the base to process the comestible material in the container.

A typical food processor is structurally and operationally different from blenders, but particularly different from inverted blenders. A food processor is generally comprised of a motor base and a processor container that is typically larger than a blender container. Because the processor container is large, it generally has a handle to allow a user to better hold and handle the container. The processor container can accommodate different types of cutting blades to perform different processing operations. The processor container also typically has a lid with a "feed tube" and a "pusher". The feed tube serves as a chute into which comestible material can be added during processing by using the pusher to move the comestible material through the feed tube and into the processor container.

To reduce the need to purchase multiple appliances, it is desirable to have a single kitchen appliance that can combine the uses and operations of both a blender and a food processor. However, since the components of the blender and the food processor are very different in size and configurations, to combine their uses and operations in one appliance it is necessary for the motor base to accommodate different containers and blade attachments of different sizes and configurations.

Further, blenders and food processors generally have different safety mechanisms due to their different designs. If a single appliance is to combine the functions and operability of both a blender and a food processor, then the safety mechanisms must be able to work with different components and configurations.

For an inverted blender for example, one kind of safety mechanism is to prevent the motor from operating if the blade attachment is not properly secured to the motor base. If the blade attachment is not securely mounted on the base when the motor is activated, then there is a risk that the blade attachment could come off the base, which could potentially cause serious injury. Additionally, if the blade attachment becomes unsecured from the base while the motor is operating, there is likewise a risk of serious injury. Hence, there is a need for a safety mechanism that will disable the motor if the blade attachment is not properly secured to the motor base.

Another risk for an inverted blender is that the container could become detached from the blade attachment while the blender is operating, which could also potentially cause serious injury. Thus, another kind of safety mechanism is to prevent the motor from operating if the container is not securely attached to the blade attachment, or to automatically shut off the motor if the container becomes detached from the blade attachment during operation.

It is desirable for an inverted blender to have both kinds of safety mechanisms to ensure that both the container is securely attached to the blade attachment and the blade attachment is securely mounted on the base at all times while the appliance is in operation.

For a food processor, there is a risk that the container may separate from the motor base during operation. Thus, one safety mechanism is to ensure that the container is securely mounted on the base before the motor can be activated and at all times while the motor is in operation. There is also a risk that the lid may become detached from the container while the food processor is in operation. Thus, another safety mechanism is to ensure that lid is securely attached to the container before the motor can be operated, or if the lid becomes detached from the container during operation then the motor will automatically shut off.

Therefore, it is an object of the invention to provide an appliance that can be safely used as a blender and a food processor.

It is an object of the invention to provide a combination blender and food processor appliance having safety mechanisms.

It is an object of the invention to provide a blender with a safety mechanism for ensuring that the blender container is securely attached to the blade attachment.

It is an object of the invention to provide a blender with a safety mechanism for ensuring that the blade attachment is securely attached to the motor base.

It is an object of the invention to provide a food processor with a safety mechanism for ensuring that the food processor container is securely attached to the motor base.

It is an object of the invention to provide a food processor with a safety mechanism for ensuring that the lid is securely attached to the food processor container when the food processor is in operation.

It is an object of the invention to utilize safety mechanisms that can work with the components of both the blender and the food processor.

SUMMARY OF THE INVENTION

In accordance with the objectives of the invention, the embodiments of the present invention relate to an appliance operable in a first configuration as a blender and in a second configuration as a food processor.

For both configurations, the appliance has a base with a motor for operating the appliance. The motor drives a first base impeller for operating in the first configuration, and a second base impeller for operating in the second configuration.

The base further has a first safety switch associated with the motor, such that the motor is only operable when the first safety switch is actuated. In another embodiment, the base also has a second safety switch associated with the motor, such that the motor is only operable when the second safety switch is actuated. In this embodiment the motor will not turn on unless both switches are actuated. Conversely, the motor will shut off if either the first safety switch or the second safety switch becomes switched off during operation.

The appliance according to the present invention has a blender assembly for use in the first configuration. The blender assembly comprises a blender container and a blade attachment. The blade attachment is attachable to the blender container. When the blade attachment is attached to the blender container, the blade attachment can be mounted to the base. The blade attachment has a blade attachment impeller for coupling with the first base impeller when the blade attachment is mounted on the base.

In an embodiment, the blade attachment has a movable tab. When the blade attachment is attached to the blender container, the blender container causes the tab to move from a first position to a second position. When the blender assembly is mounted to the base by coupling the blade attachment impeller with the first base impeller, the movable tab actuates a safety switch on the base when the movable tab is in the second tab position.

In another embodiment, the blade attachment has another movable tab. In this embodiment, when the blade attachment is attached to the blender container, the blender container causes both tabs to move to the second position, such that the tabs actuate both safety switches on the base when the tabs are in the second tab position.

The appliance according to the present invention also has a processor assembly for use in a second configuration. The processor assembly comprises a processor container and a lid that is attachable to the processor container. The processor container has a processor container impeller for coupling with the second base impeller.

In an embodiment, the processor container has a movable lever. When the lid is attached to the processor container, the lid causes the movable lever to move from a first lever position to a second lever position. When the processor container is mounted to the base by coupling the processor container impeller with the second base impeller, the movable lever actuates a safety switch on the base when the movable lever is in the second lever position.

In another embodiment, the processor container also has a fixed tab. When the processor assembly is mounted to the base, and the movable lever actuates a first safety switch on the base, at the same time the fixed tab actuates a second safety switch on the base.

BRIEF DESCRIPTION OF THE DRAWINGS

FIG. 2 is a top perspective view of a base of the appliance in accordance with an embodiment of the present invention.

FIG. 3 is a bottom perspective view of the base in accordance with an embodiment of the present invention.

FIG. 19 is an exploded view of a handle assembly for a food processor assembly in accordance with an embodiment of the present invention.

FIG. 20 is a side sectional view of a handle assembly and lid assembly for a food processor assembly in accordance with an embodiment of the present invention.

FIG. 21 is a cross sectional view of a handle assembly and lid assembly (shifted 90° clockwise relative to FIG. 20) and shows how the lid assembly interacts with the handle assembly for a food processor assembly in accordance with an embodiment of the present invention.

FIG. 22 is a side sectional view of a handle assembly and lid assembly for a food processor assembly in accordance with an embodiment of the present invention.

FIG. 23 is a cross-sectional view of a handle assembly and lid assembly (shifted 90° clockwise relative to FIG. 22) and shows how the lid assembly interacts with the handle assembly for a food processor assembly in accordance with an embodiment of the present invention.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and to fully convey the scope of the invention to those skilled in the art.

Figure 1:
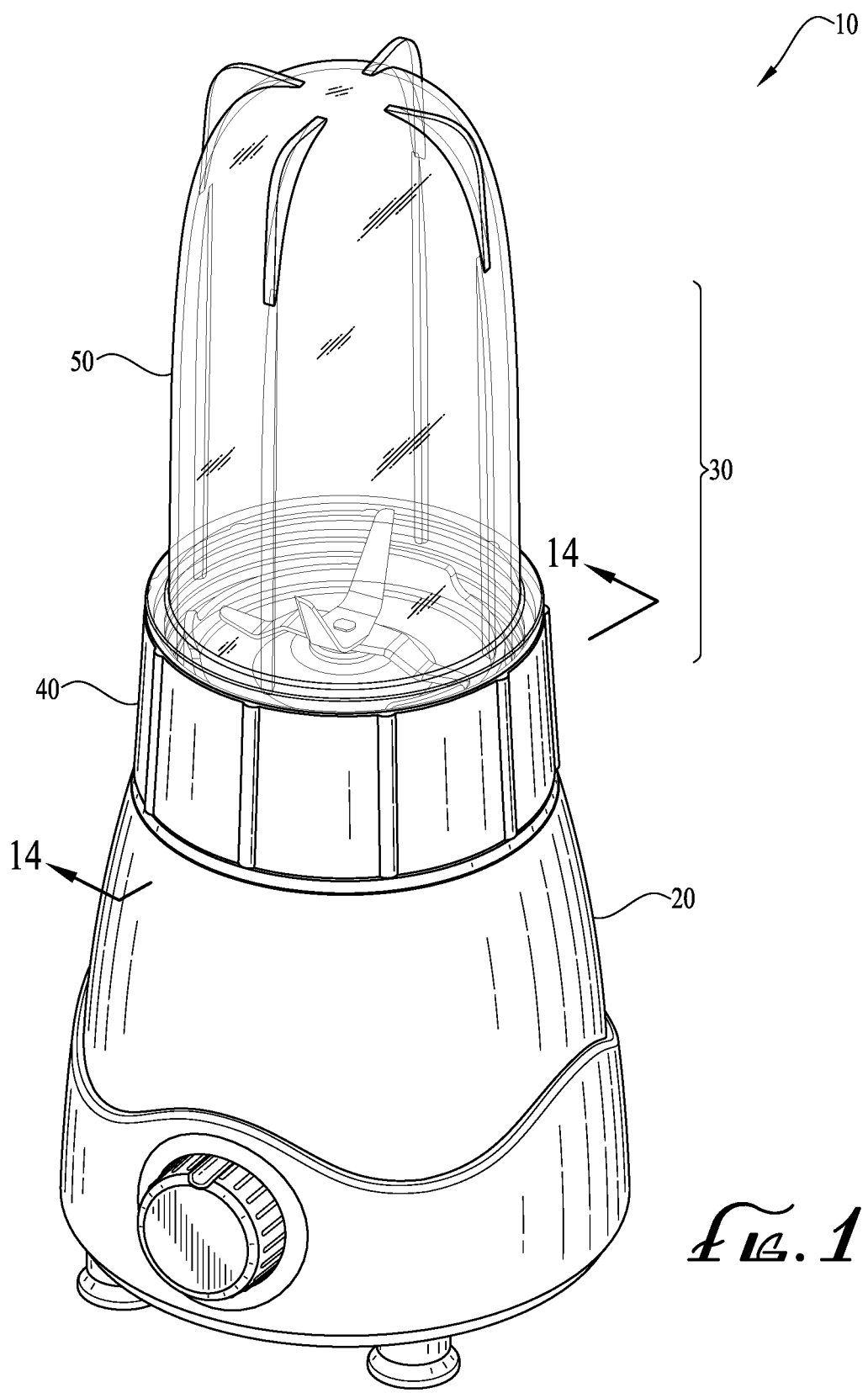
FIG. 1 is a perspective view of an appliance in accordance with an embodiment of the present invention in a blender configuration.

As shown in FIG. 1, an appliance 10 according to an embodiment of the invention in a blender configuration is comprised of a base 20 and a blender assembly 30. The blender assembly 30 is comprised of a blade attachment 40 and a blender container 50.

Figure 16:
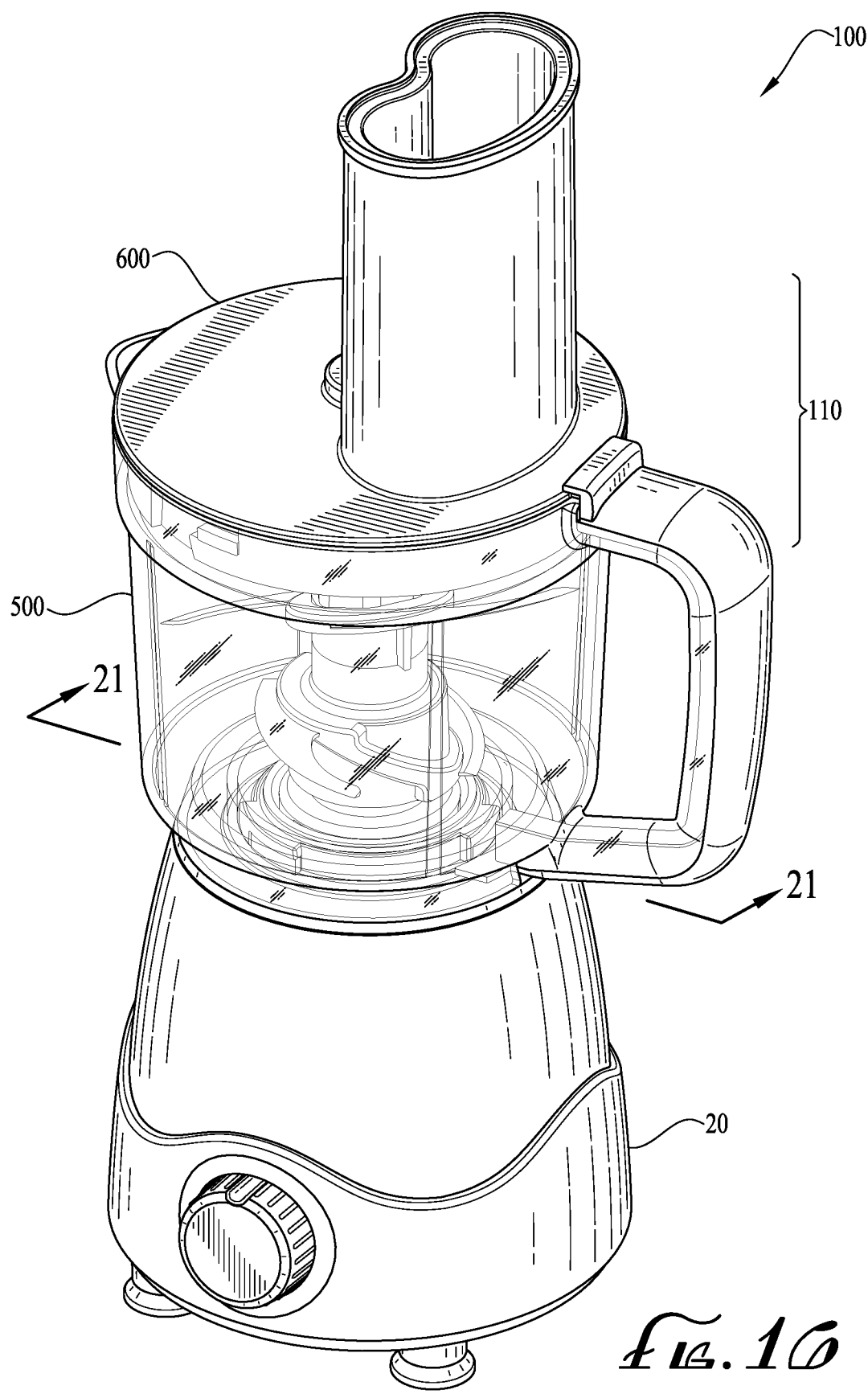
FIG. 16 is a perspective view of an appliance in accordance with an embodiment of the present invention in a food processor configuration.

As shown in FIG. 16, an appliance 100 according to an embodiment of the invention in a food processor configuration is comprised of a base 20 and a food processor assembly 110. The food processor assembly 110 is comprised of a processor container 500 and a lid assembly 600.

The base 20 is identical for both the blender configuration and the food processor configuration.

Referring to FIGS. 2 to 5, the base 20 is characterized by a top side 210, a vertical side 212, and a bottom side 214, which houses a motor (not shown). The base 20 has controls 216 on the vertical side 212, which operates to turn on and off the motor and perform other operations.

In a preferred embodiment as shown in FIG. 2, the base 20 has a first motor impeller 220 driven by the motor for operating in a blender configuration and a second motor impeller 230 likewise driven by the motor for operating in a food processor configuration.

Figure 5:
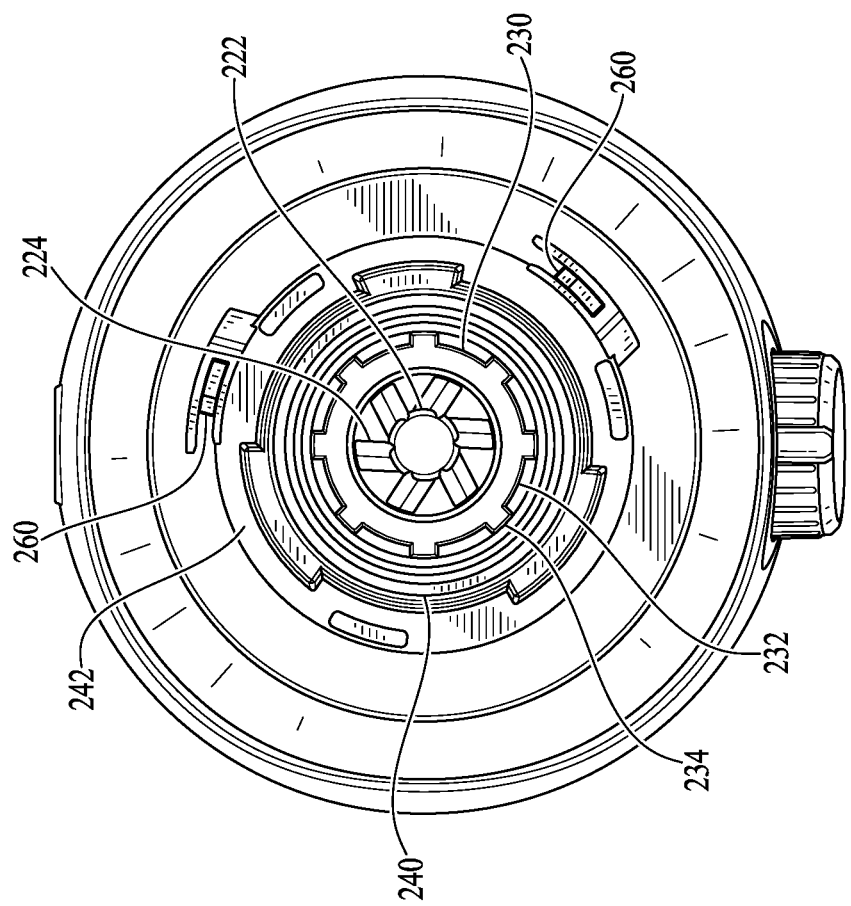
FIG. 5 is a top view of the base in accordance with an embodiment of the present invention.
Figure 6:
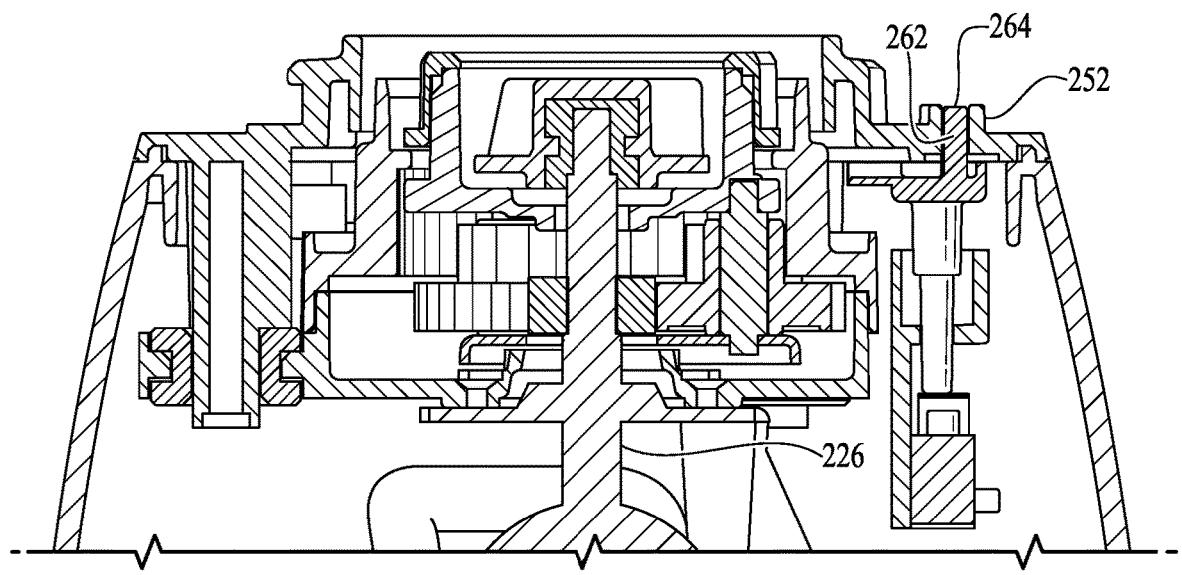
FIG. 6 is a side sectional view of the base in accordance with an embodiment of the present invention.

The first motor impeller 220 is mounted at the center of the top side 210. The first motor impeller 220 is characterized by a hub 222 with first impeller vanes 224 projecting radially outward as best shown in FIGS. 2 and 5. The first motor impeller 220 is connected to a shaft 226 (as best shown in FIG. 6) of the motor (not shown) such that the motor is capable of causing the first motor impeller 220 to rotate.

The second motor impeller 230 is mounted concentrically with respect to the first motor impeller 220 on the top side 210. The second motor impeller 230 is characterized by a sprocket 232 that encircles the first motor impeller 220 shown in FIG. 5. The sprocket 232 has teeth 234 extending radially outwards. The second motor impeller 230 is associated with the first motor impeller 220 such that when the motor drives the rotation of the first motor impeller 220, it also drives the rotation of the second motor impeller 230.

Figure 4:
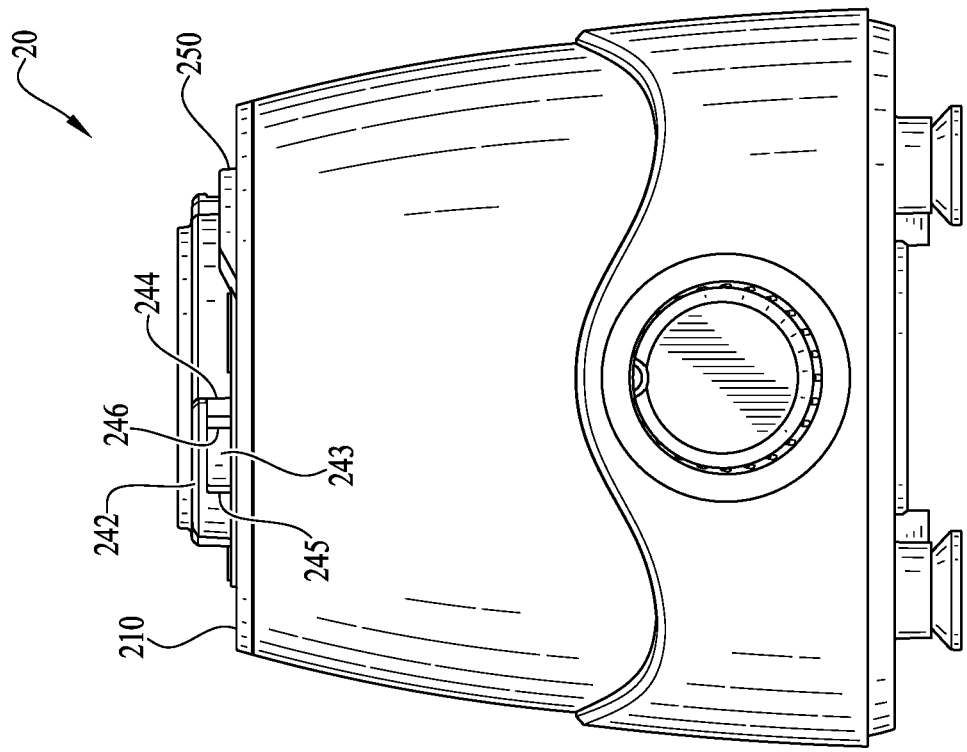
FIG. 4 is a side view of the base in accordance with an embodiment of the present invention.

The base 20 further has a circular retaining wall 240 that encircles the second motor impeller 230 and the first motor impeller 220 as best shown in FIGS. 2, 4, and 5. The circular retaining wall 240 has brackets 242. In a preferred embodiment of the invention, the circular retaining wall 240 has three brackets 242 that are equally spaced along the circumference of the circular retaining wall 240. The brackets 242 operate to retain the blender assembly 30 or the food processor assembly 110 to the base 20 as described below.

The appliance 10 according to an embodiment of the invention in a blender configuration as shown in FIG. 1 is now described. The appliance 10 is comprised of a base 20 and a blender assembly 30.

Figure 12:
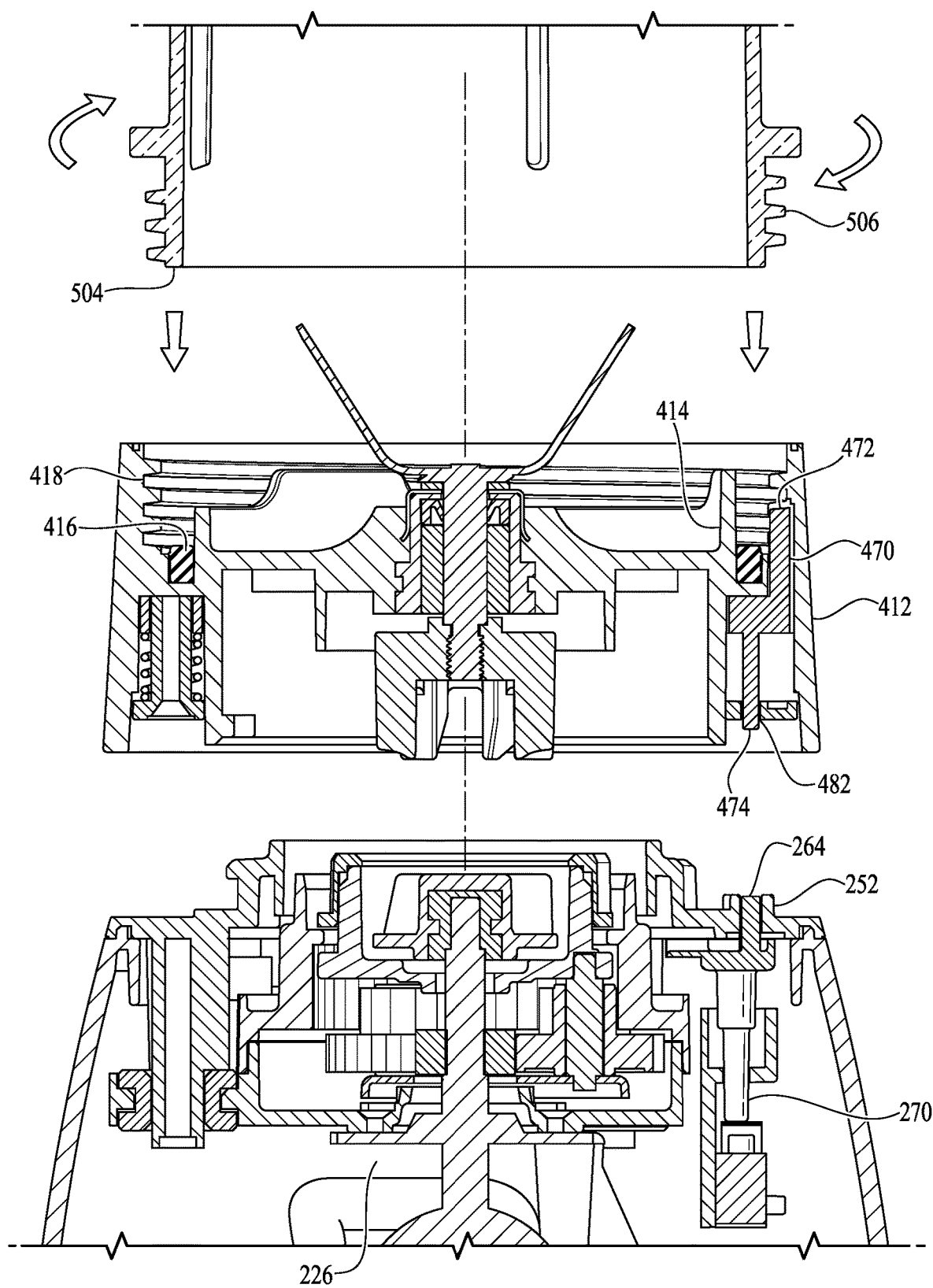
FIG. 12 is a side sectional view of the appliance in a blender configuration in accordance with an embodiment of the present invention.
Figure 13:
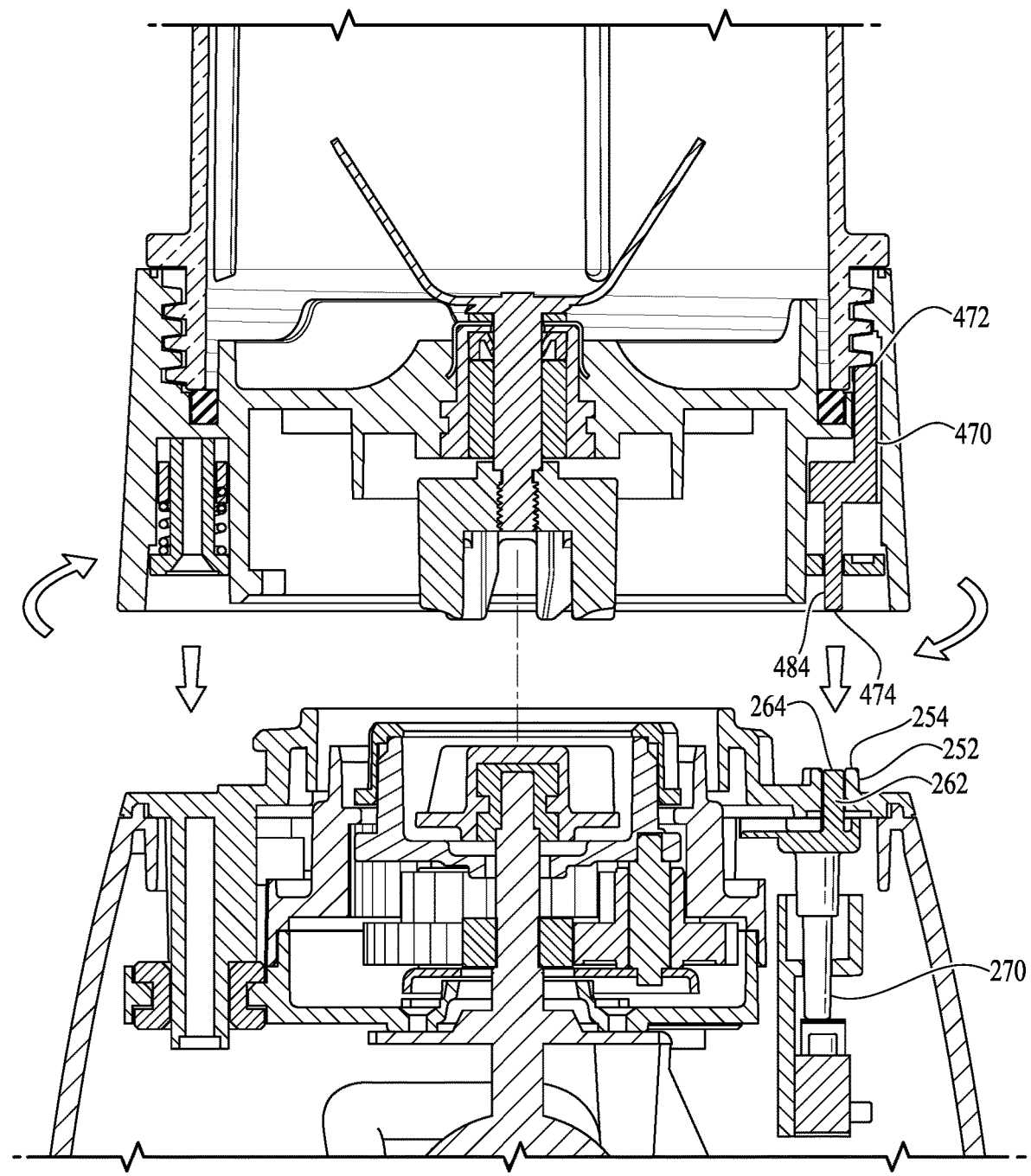
FIG. 13 is a side sectional view of the appliance in a blender configuration in accordance with an embodiment of the present invention.

The blender assembly 30 is comprised of a blade attachment 40 and a blender container 50 with an open end 502. As shown in FIGS. 1, 12, and 13, the blade attachment 40 is removably attached to the blender container 50 on the open end 502 to form a closed space for processing comestible material.

Figure 8:
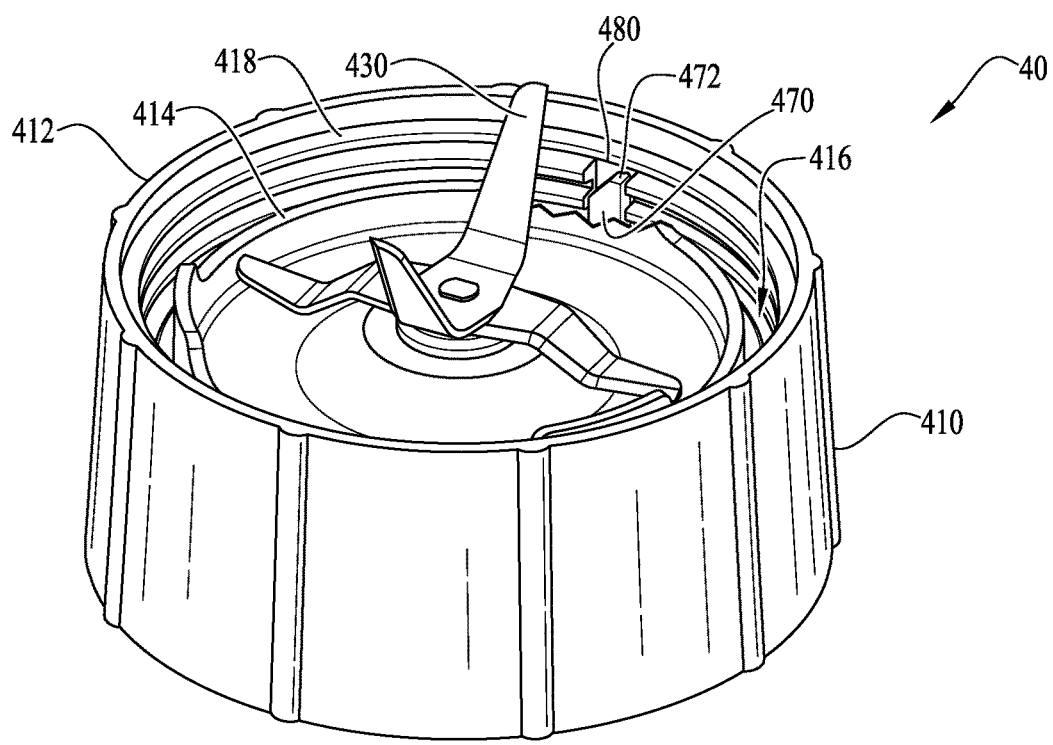
FIG. 8 is a top perspective view of a blade attachment in accordance with an embodiment of the present invention.
Figure 9:
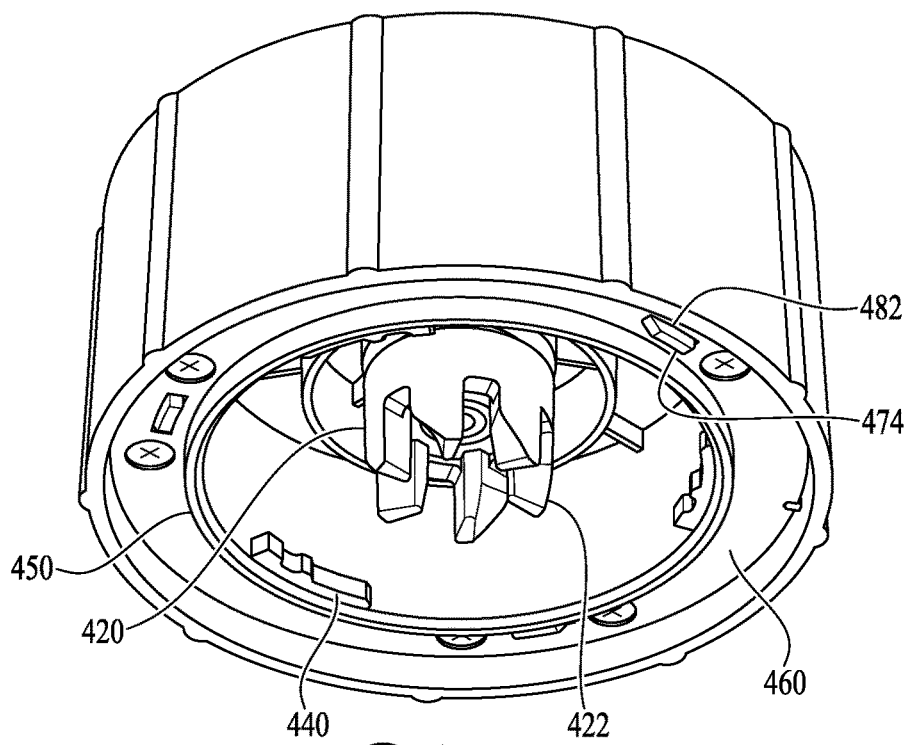
FIG. 9 is a bottom perspective view of a blade attachment in accordance with an embodiment of the present invention.
Figure 10:
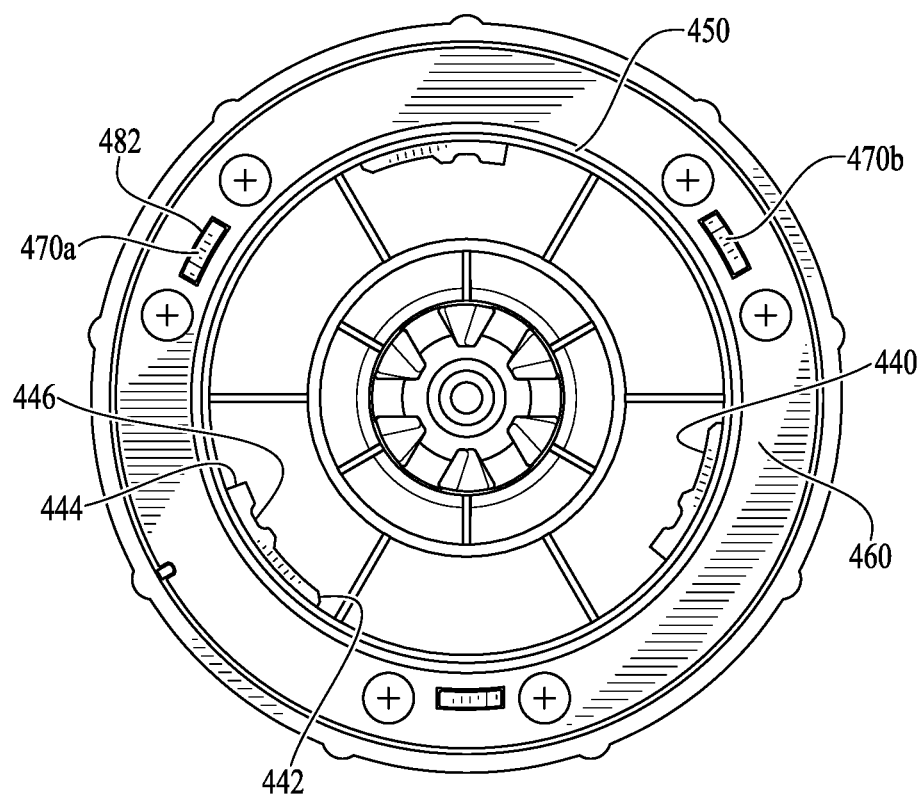
FIG. 10 is a bottom view of a blade attachment in accordance with an embodiment of the present invention.

Referring to FIGS. 8 through 10, the blade attachment 40 is comprised of a blade holder 410, with cutting blade or blades 430 on a top side and a blade impeller 420 on a bottom side. As shown in FIGS. 1 and 8, the cutting blade 430 is mounted on a top side of the blade holder 410 such that when the blade attachment 40 is assembled to the blender container 50, the cutting blade 430 is inside the blender container 50.

Referring to FIGS. 8 and 12, the blade holder 410 has an outer wall 412 and an inner wall 414, forming a trench 416 between the outer wall 412 and the inner wall 414 on the top side. The blade holder 410 has threads 418 on an inner side of the outer wall 412. The threads 418 of the blade attachment 40 are complementary to the threads 506 of the blender container 50 for connecting the blade attachment 40 to the blender container 50. Though the blender container 50 may be connected to the blade attachment 40 using any other manner known in the art so that the rim 504 of the blender container 50 rests in the trench 416 of the blade attachment 40.

The blade impeller 420 is mounted on the bottom side of the blade holder 410 as shown in FIG. 9. The blade impeller 420 is configured to couple with the first motor impeller 220 on the base 20 as described below. The blade impeller 420 is connected to the cutting blade 430. When the blade impeller 420 is driven by the first motor impeller 220, the blade impeller 420 functions to spin the cutting blade 430 to process the comestible material.

Figure 11:
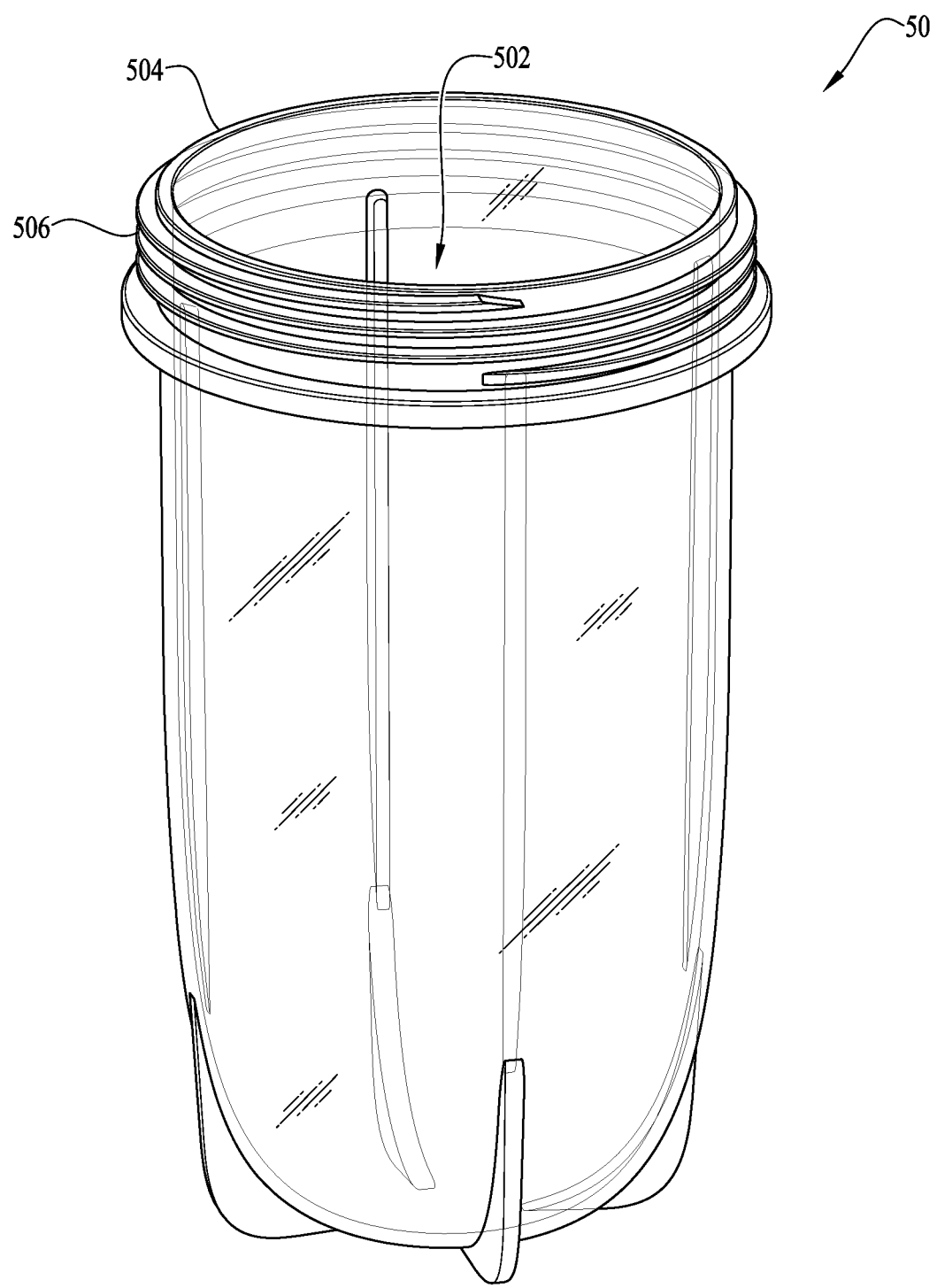
FIG. 11 is a perspective view of a container for a blender configuration in accordance with an embodiment of the present invention.

Referring to FIG. 11, the blender container 50 has an open-end 502 that is defined by a rim 504. In a preferred embodiment, the blender container 50 is semi-oval-shaped (i.e. bullet shaped), though it can have any shape that serves the intended function of the invention. The blender container 50 has threads 506 that wrap spirally along the outer side near the open-end 502.

Referring to FIG. 12, the blender assembly 30 is formed by assembling the blade attachment 40 to the blender container 50. The blade attachment 40 is assembled to the open-end 502 of the blender container 50 by engaging threads 418 with threads 506, and rotating the blade attachment 40 until the rim 504 of the blender container 50 rests in the trench 416 of the blade attachment 40 to seal the open-end 502 of the blender container 50.

To form the blender configuration as shown in FIG. 1, the blender assembly 30 is mounted to the base 20 as follows.

After the blade attachment 40 is assembled to the blender container 50, the blender assembly 30 is mounted on the base 20 by coupling the blade impeller 420 with the first motor impeller 220 on the base 20. As shown in FIG. 9, the blade impeller 420 has a plurality of blade impeller arms 422. To couple the blade impeller 420 with the first motor impeller 220, the blade impeller arms 422 are inserted into the spaces between the vanes 224 of the first motor impeller 220, such that the first motor impeller 220 is capable of rotating the blade impeller 420.

When the blade impeller 420 is coupled with the first motor impeller 220, the blade attachment 40 is rotated to securely attach it to the base 20 as follows.

The blade attachment 40 has keys 440 as shown in FIGS. 9 and 10. The key 440 is an elongated protrusion located on the edge of a vertical annular wall 450 approximate to horizontal annular surface 460. The key 440 has a head end 442 and a tail end 444, and a notch 446 therebetween. In a preferred embodiment of the invention, the blade attachment 40 has three keys 440 circumferentially spaced equally apart on the vertical annular wall 450 as shown in FIG. 10.

Referring again to FIGS. 2 and 5, in a preferred embodiment the base 20 has three brackets 242, which are equally spaced along the circumference of the circular retaining wall 240 to correspond with the three keys 440 of the blade attachment 40. Each bracket 242 is defined by a recess 243 sized to accommodate a key 440. Each recess 243 is defined by an open end 244 and a closed end 245, and a bump 246 therebetween.

When the blade attachment 40 is placed on top of the base 20 by coupling the blade impeller 420 with the first motor impeller 220, the vertical annular wall 450 of the blade attachment 40 fits over the circular retaining wall 240 on the top surface 210 of the base 20, such that the keys 440 are substantially aligned with the brackets 242. The blade attachment 40 is rotated to slide each key 440 into each bracket 242. As the blade attachment 40 is rotated, the head end 442 of the key 440 enters the open end 244 of the recess 243 of the bracket 242, until the head end 442 of the key 440 abuts against the closed end 245 of the recess 243. This requires the blade attachment 40 to be rotated only in one direction to attach the blade attachment 40 to the base 20. If the blade attachment 40 is rotated in the reverse direction, the head end 442 of the key 440 cannot slide into the recess 243 of the bracket 242 because the tail end 444 of the key 440 will abut against the closed end 245 of the recess 243. When the blade attachment 40 is properly rotated to slide the head end 442 of the key 440 into the recess 243, the bump 246 will come to rest in the notch 446, to indicate that the blade attachment 40 is securely attached to the base 20.

Figure 15:
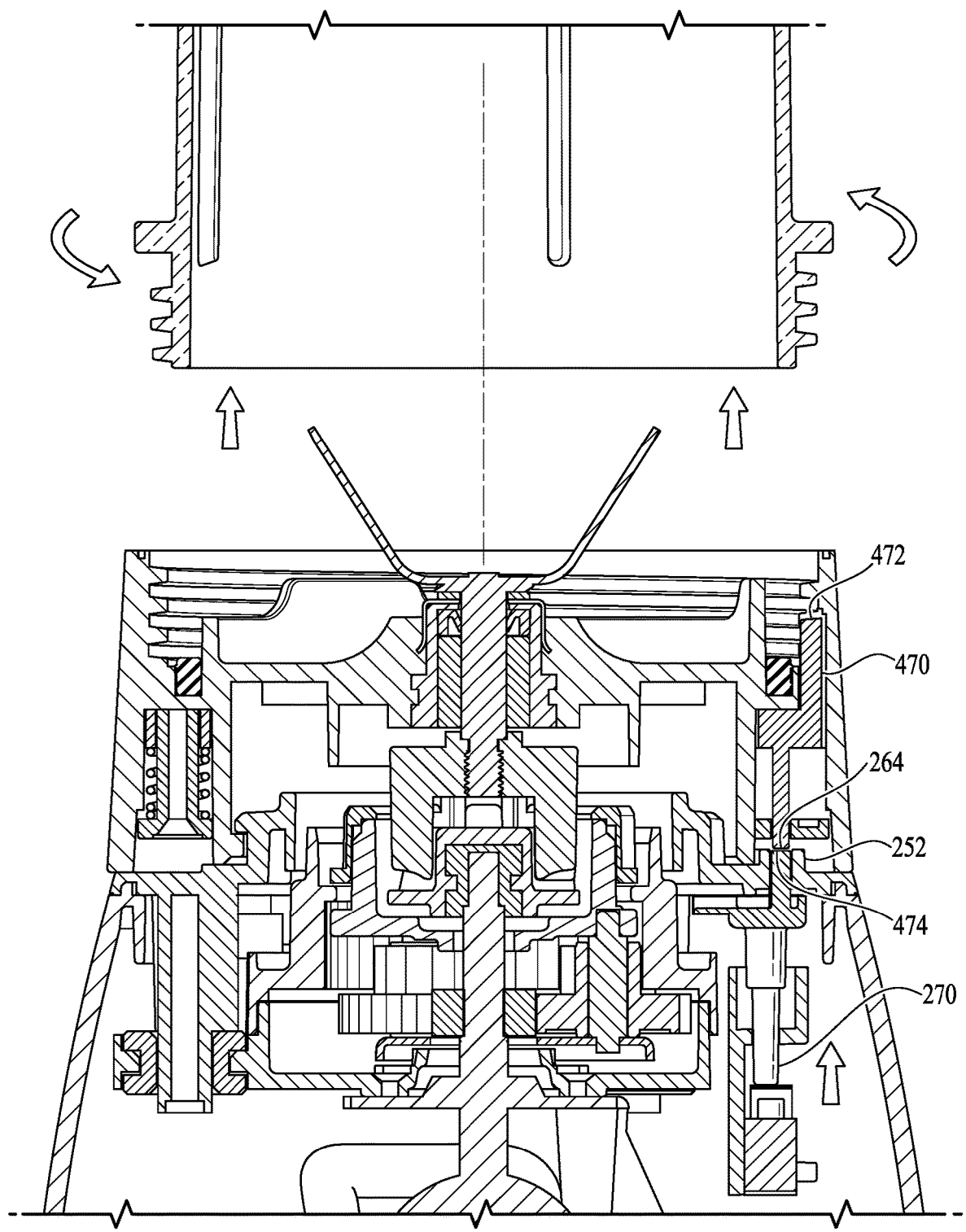
FIG. 15 is a side sectional view of the appliance in a blender configuration in accordance with an embodiment of the present invention.

Referring now to FIGS. 6 and 15, a preferred embodiment of the blender configuration has two blender-configuration safety mechanisms. The blender-configuration safety mechanisms function to ensure that the blender container 50 is securely attached to the blade attachment 40, and the blade attachment 40 is securely attached to the base 20 before the motor can be turned on to perform processing operations. The blender-configuration safety mechanisms are now described.

As shown in FIG. 8, the blade attachment 40 has a tab 470 located between the inner wall 414 and the outer wall 412. The tab 470 has a top end 472 and a bottom end 474. The top end 472 is located in an opening 480 on the inner side of the outer wall 412 of the blade holder 410 where the threads 418 are located. The bottom end 474 extends out of an opening 482 on the horizontal annular surface 460 on the bottom side of the blade holder 410 as shown in FIG. 9.

The tab 470 is spring loaded (not shown) such that it is movable between a default first elevation and a second elevation. As shown in FIG. 12, in the default first elevation, the spring pushes the tab 470 upward such that the top end 472 is elevated in the opening 480. As shown in FIG. 13, in the second elevation, the tab 470 is pushed downward by an external force, compressing the spring, such that the bottom end 474 extends further out of the opening 482 in the horizontal annular surface 460. When the external force is removed, the spring decompresses and pushes the tab 470 back to its default first elevation.

In a preferred embodiment of the invention, the blender attachment 40 has at least two tabs 470, a first tab 470a located at a first circumferential position A and a second tab 470b located at a second circumferential position B as shown in FIG. 10. The first tab 470a is located at the first circumferential position A such that when the blade attachment 40 is assembled to the open-end 502 of the blender container 50 by engaging threads 418 with threads 506 and rotating the blade attachment 40, the threads 506 will cause the first tab 470a to move from the first elevation to the second elevation such that the bottom end 474 extends out of the opening 482 as shown in FIG. 13. As the blade attachment 40 is further rotated, the threads 506 will cause the second tab 470b to move from the first elevation to the second elevation such that the bottom end 474 extends out of the opening 482. The threads 506 cause the first tab 470a and then the second tab 470b to move in sequence. In this way, the blender container 50 must be firmly attached to the blade attachment 40 by fully threading the blade attachment 40 with the blender container 50 in order to move both first and second tabs 470a, 470b into the second elevation.

In another preferred embodiment of the invention, the blender attachment 40 has three tabs 470, located sequentially such that threading the blade attachment 40 with the blender container 50 causes each tab 470 to move to the second elevation in sequence.

The base 20 has a switch mechanism 260 that correlates with the tab 470 on the blender attachment 40. In a preferred embodiment of the invention, the base 20 will have at least two switch mechanisms 260 as shown in FIGS. 2 and 5.

Referring to FIG. 2, the base 20 has an interlock 250 located on the top side 210. The interlock 250 is located at a radial distance from the center of the base 20 such that it aligns with a tab 470 when the blade attachment 40 is assembled to the base 20.

Figure 7:
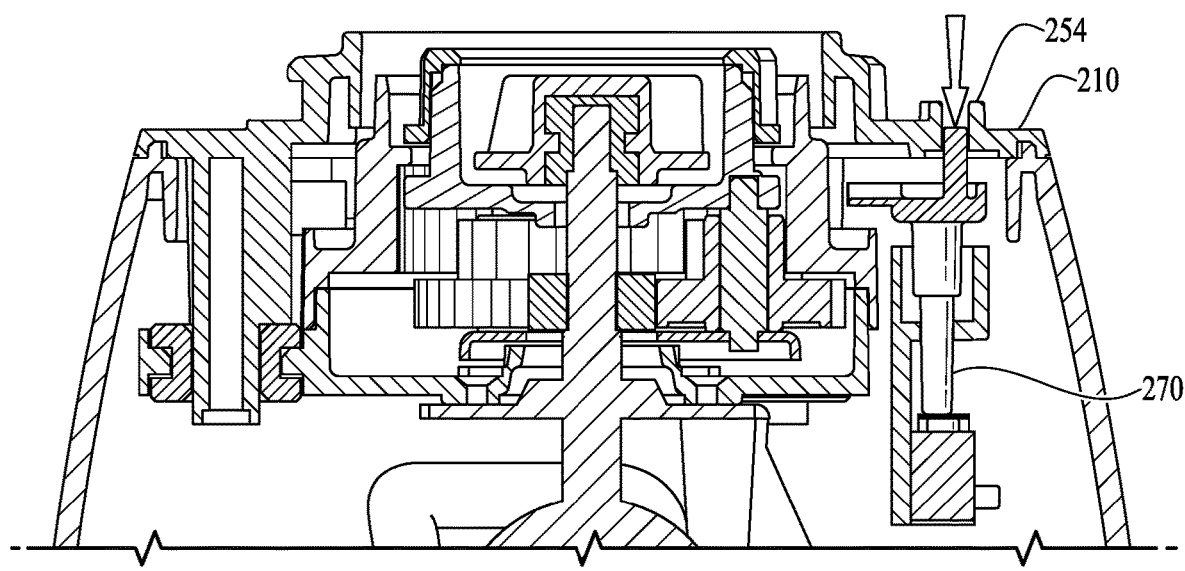
FIG. 7 is a side sectional view of the base in accordance with an embodiment of the present invention.

The interlock 250 is comprised of walls 252 having a top edge 254. The walls 252 enclose a retractable switch 262. As shown in FIGS. 6, 12, and 13, the retractable switch 262 has a top surface 264. The retractable switch 262 is spring-loaded to be movable between an extended position and a retracted position. In the extended position as shown in FIGS. 6, 12, and 13, the top surface 264 of the retractable switch 262 is substantially flush with the top edge 254 of the walls 252. In the retracted position as shown in FIGS. 7 and 14, the retractable switch 262 is pushed downward by an external force such that the top surface 264 is substantially flush with the top surface 210 of the base 20.

The retractable switch 262 is connected to an actuator 270 in the base 20 that enables actuation of the motor. When the retractable switch 262 is in the default extended position as shown in FIGS. 6, 12, 13, the actuator 270 is not actuated and the motor cannot start. When the retractable switch 262 is in the retracted position as shown in FIGS. 7 and 14, the actuator 270 is actuated and the motor can start. In the preferred embodiment having two retractable switches 262, both retractable switches 262 must be pushed down into the retracted position to start the motor.

To actuate the retractable switch 262 in the blender configuration, it is necessary to assemble the blade attachment 40 securely to the blender container 50 to form the blender assembly 30, then mount the blender assembly 30 securely to the base 20. Both steps are required to enable the motor to be turned on.

Figure 14:
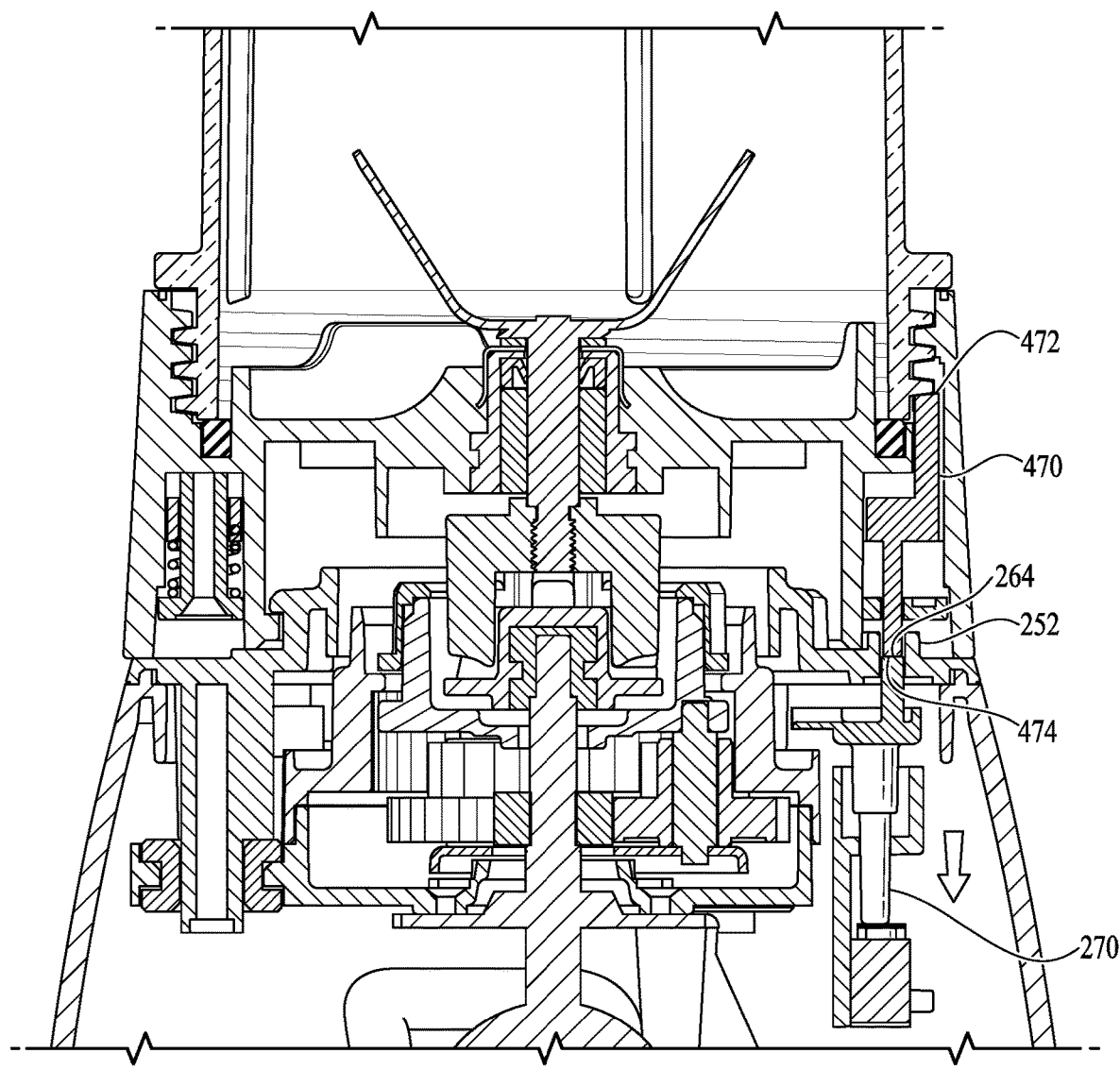
FIG. 14 is a side sectional view of the appliance in a blender configuration in accordance with an embodiment of the present invention.

As shown in FIGS. 13 and 14, when the blade attachment 40 is assembled to the blender container 50 by engaging threads 418 with threads 506 and rotating the blade attachment 40, the threads 506 will depress the tabs 470 sequentially. The first tab 470a is pushed down such that the bottom end 474 extends out of the opening 482. As the blade attachment 40 is further rotated, the second tab 470b is pushed down such that the bottom end 474 extends out of the opening 482.

Thus, when the blade assembly 30 is mounted to the base 20 by coupling the blade impeller 420 with the first motor impeller 220 and rotating the blade attachment 40 clockwise to slide the key 440 into the recess 243, the tabs 470 will enter the interlock 250, making engagement with the retractable switches 262. The tabs 470 push the retractable switches 262 into the retracted position as shown in FIG. 14, actuating the actuator 270 which allows the motor to be started by the controls 216. When the blade attachment 40 is rotated counterclockwise to dismount the blade assembly 30 from the base 20, the tabs 470 disengage from the retractable switches 262, and the retractable switches 262 return to the default extended position, wherein the motor is shut off.

If during operation of the appliance 10 the blender container 50 should come loose or become detached from the blade attachment 40, the spring-loaded tabs 470 will automatically return to their default first elevation as shown in FIG. 15. As a result, the retractable switches 262 return to the default extended position, thus shutting off the motor. In this way, the appliance 10 according to an embodiment of the blender configuration is made safe because it can only be operated when the container 50 is securely attached to the blade attachment 40, and the blade attachment 40 is securely mounted to the base 20.

Referring to FIG. 16, an appliance 100 according to an embodiment of the invention in a food processor configuration is comprised of a base 20 and a food processor assembly 110. The appliance 100 according to an embodiment of the food processor configuration is now described.

Figure 17:
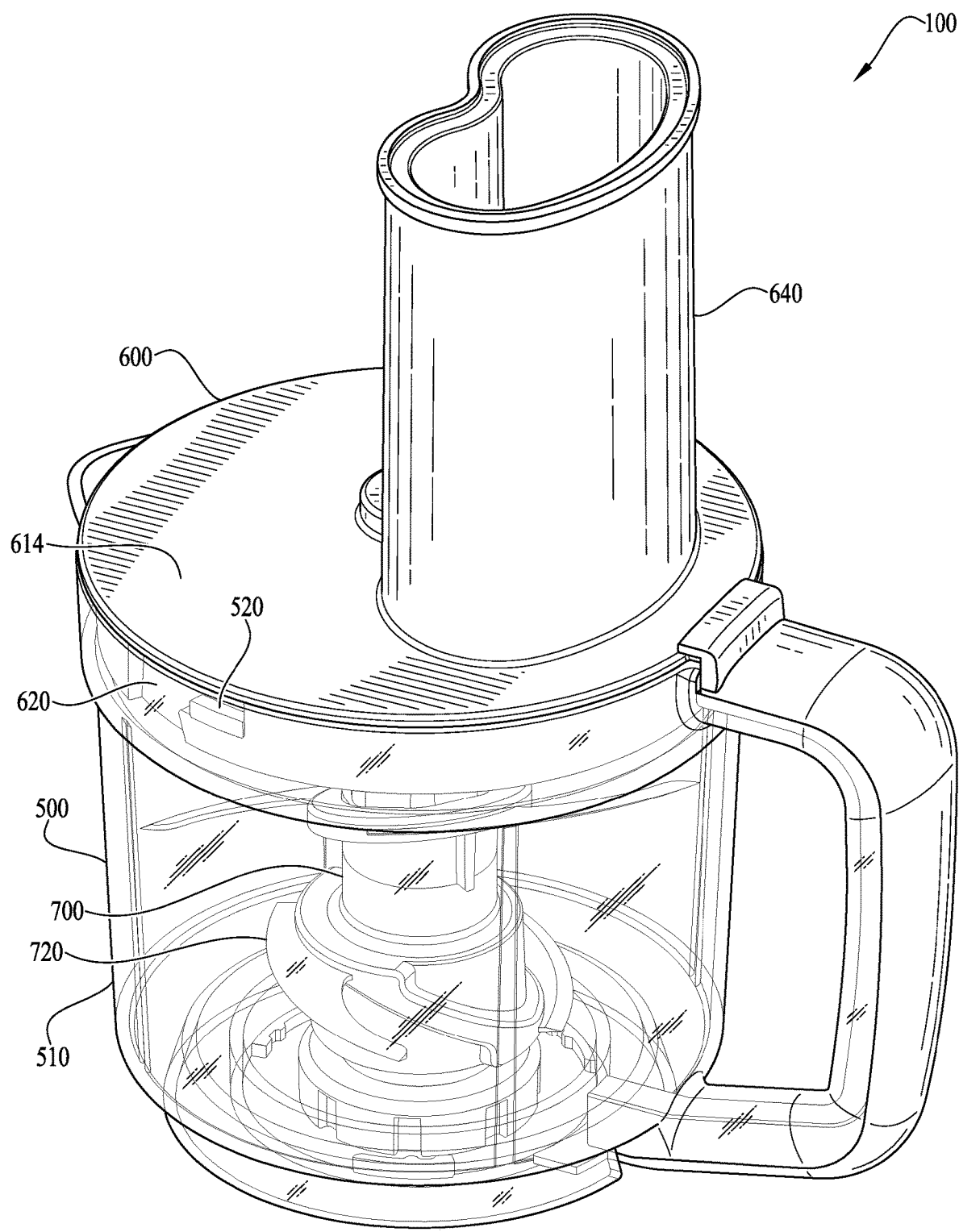
FIG. 17 is a top perspective view of a food processor assembly in accordance with an embodiment of the present invention.

Referring to FIG. 17, the food processor assembly 110 is comprised of a processor container 500 and a lid assembly 600. As shown in FIGS. 20 and 22, the lid assembly 600 is removably attached to the processor container 500 to form a closed space for processing comestible material.

Figure 18:
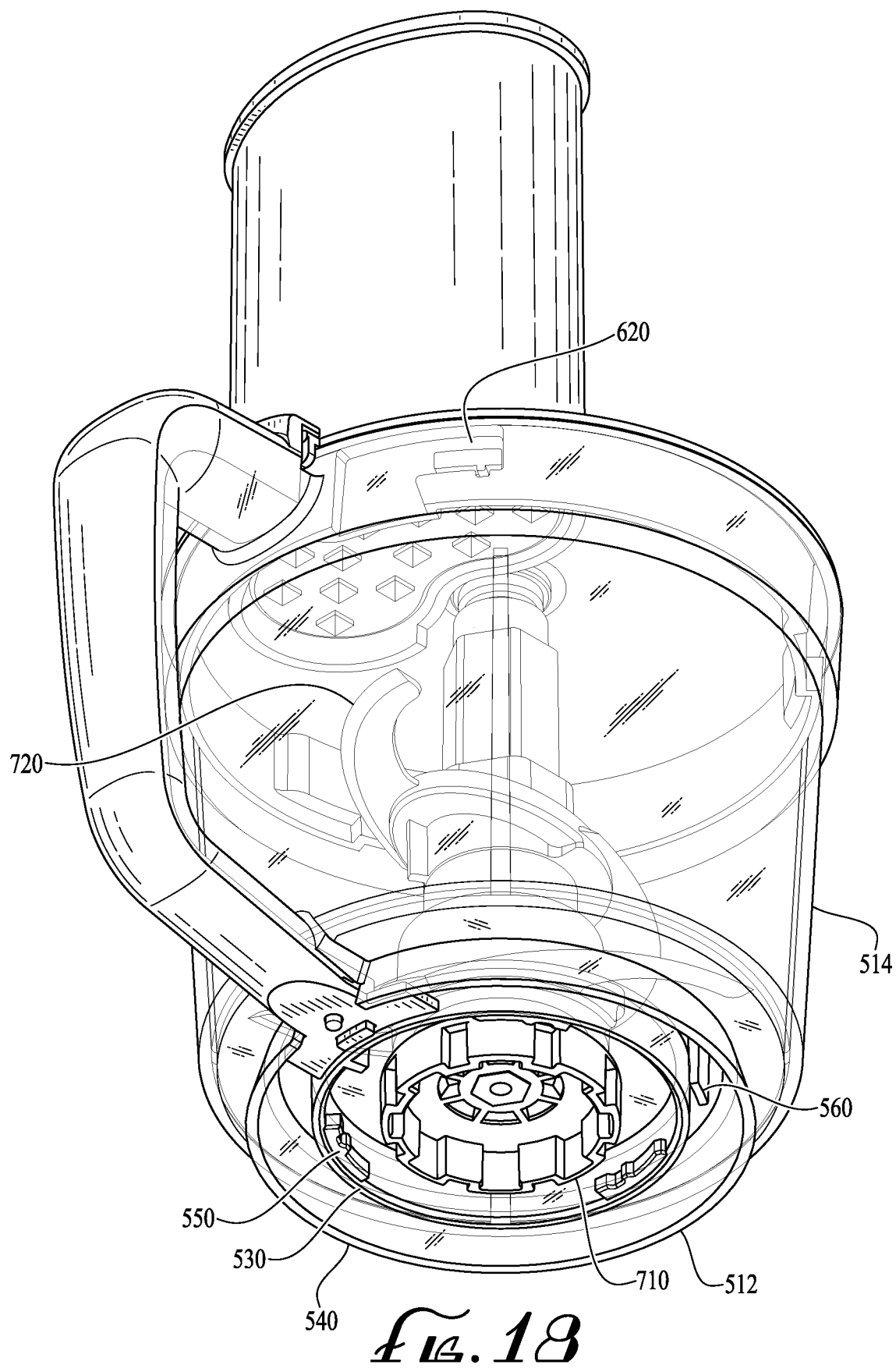
FIG. 18 is a bottom perspective view of a food processor assembly in accordance with an embodiment of the present invention.

Referring to FIGS. 17 and 18, the processor container 500 has a body 510, a blade assembly 700, and a handle assembly 800.

The body 510 is defined by a bottom 512, a vertical side 514, and an open top 516 forming a processor cavity. The blade assembly 700 is mounted to the bottom 512 such that it is located in the processor cavity.

Referring to FIGS. 17 and 19, The handle assembly 800 is attached to the vertical side 514 such that it is outside the processor cavity.

As shown FIGS. 17 and 18, the body 510 of the processor container 500 has a circular vertical side 514 with an inner side and an outer side. The body 510 has locking protrusions 520 for securing the lid assembly 600. The locking protrusions 520 are located on the inner side of vertical side 514 near the open top 516 as shown in FIG. 19. In a preferred embodiment, the body 510 has three locking protrusions 520.

The body 510 has a bottom 512 further defined by an interior side as shown FIG. 17 in and an underside as shown FIG. 18. Referring to FIG. 18, the underside has an inner circular wall 530 and an outer circular wall 540. The body 510 has keys 550 located on the inner circular wall 530, the keys 550 being substantially the same as the keys 440 on the blade attachment 40 described above. In a preferred embodiment of the invention, the body 510 has three keys 550 equally spaced apart along the circumference of the inner circular wall 530 to correspond with the three brackets 242 on the base 20.

The body 510 has a fin 560 located on the underside between the inner circular wall 530 and the outer circular wall 540 as shown in FIG. 18. The fin 560 is located a radial distance from center such that it aligns with the retractable switches 262 on the base 20 when the processor container 500 is mounted on the base 20.

The body 510 has a handle backbone 570 that forms part of the handle assembly 800 as further described below.

Referring to FIGS. 17 and 18, the blade assembly 700 mounted to the bottom 512 of the processor container 500. The blade assembly 700 is comprised of a impeller mount 710 connected to a cutting blade attachment 720. The impeller mount 710 is rotatably mounted on the underside of the body 510 for coupling with the second motor impeller 230 on the base 20. The cutting blade attachment 720 is connected to the impeller mount 710 such that the cutting blade attachment 720 stands vertically in the processor cavity as shown in FIG. 18. When the impeller mount 710 is rotated by the second motor impeller 230, it causes the cutting blade attachment 720 to spin.

As shown in FIGS. 19 to 20, the handle assembly 800 is comprised of the handle backbone 570, a handle lever 810, and a handle cover 820.

In a preferred embodiment, the handle backbone 570 is integrally attached to the outer side of the circular vertical side 514 of the body 510. The handle backbone 570 has a top portion 572 located near the open end 516, and a bottom portion 574 located at the bottom 512 of the body 510. The top portion 572 has a gap 576 and a holder 578 for holding a spring 580.

The handle lever 810 is movably attached to the handle backbone 570. The handle lever 810 has a lever-top-end 812, a lever-spine 814, and a lever-bottom-end 816. The lever-spine 814 has a slot 818. The handle lever 810 can be assembled to the handle backbone 570 by an attachment means, such as a screw, applied through the slot 818.

When the handle lever 810 is assembled to the handle backbone 570, the lever-top-end 812 is located in the top portion 572 and the lever-bottom-end 816 is located in the bottom portion 574. The lever-bottom-end 816 has a tab 824, as shown in FIG. 19, which is similar to the tab 470 described for blade attachment 40 above. The tab 824 is located such that it aligns with the retractable switches 262 when the processor container 500 is mounted on the base 20.

As shown in FIG. 19, the handle lever 810 has a dowel 813 that fits into the spring 580 and the holder 578 such that when the handle lever 810 is assembled to the handle backbone 570, the spring 580 pushes the lever-top-end 812 up into a default up position as shown in FIG. 20.

Referring to FIG. 19, the handle cover 820 is affixed to the handle backbone 570 such as to encase the handle lever 810. The handle cover 820 has two openings 826, 828 located near the bottom portion 574 the body 510. The first bottom opening 826 complements the shape of tab 824 such that tab 824 can extend through the handle cover 820. The second bottom opening 828 complements the shape of pin 822 such that pin 822 can extend through the handle cover 820.

Referring to FIG. 21, when an external force is applied to the lever-top-end 812, the handle lever 810 moves downward into a down position (as shown in FIG. 22). When the handle lever 810 is pushed into the down position, the tab 824 extends out of the first bottom opening 826 such that the tab 824 aligns with the top surface 264 of the retractable switch 262 when the processor container 500 is mounted on the base 20.

The handle lever 810 also has a pin 822 located at the lever-bottom-end 816. When the handle lever 810 is pushed into the down position by an external force, the pin 822 also extends out of the second bottom opening 828 such that the lever-bottom-end 816 will be more secure and have less freedom of movement.

Referring again to FIG. 19, the lid assembly 600 is comprised of a lid 610 and a pusher 612.

The lid 610 includes a cover 614 and a side wall 616 that extends down from under the rim 618 of the cover 614. The side wall 616 fits into the body 510 of the processor container 500 as shown in FIG. 22. The side wall 616 has indents 620 (shown in FIG. 18) that correspond with the locking protrusions 520 on the body 510 of the processor container 500. In a preferred embodiment, the lid 610 has three indents 620 spaced equally apart along the circumference of the side wall 616 to receive the three locking protrusions 520 to secure the lid 610 to the processor container 500 as shown in FIG. 17.

The lid 610 has an overhang mechanism 630 that is located on the rim 618 of the cover 614. The overhang mechanism 630 has notch 632.

The lid 610 has a chute 640 located on the top surface of the cover 614, which accommodates the pusher (not shown). The comestible material may be placed down the chute 640 and moved with the pusher (not shown) such that users do not have to place their hand inside the processor cavity.

To form the food processor assembly 110, the lid 610 is attached to bowl container 500. The lid 610 is attached to the processor container 500 by assembling the lid 610 to the open top 516 such that the locking protrusions 520 on the body 510 of the processor container 500 are received by the indents 620 on the lid 610. When the locking protrusions 520 are received by the indents 520, the lid 610 can be rotated clockwise until an edge of each locking protrusion 520 abuts against an edge of each indent 520, as shown in FIG. 17, such that the lid 610 is securely affixed the to the processor container 500.

To form the blender configuration as shown in FIG. 16, the food processor assembly 110 is mounted to the base 20 as follows.

After the lid 610 is assembled to the processor container 500 to form the food processor assembly 110, the food processor assembly 110 is mounted on the base 20 by coupling the impeller mount 710 on the underside of the body 510 with the second motor impeller 230 on the base.

When the processor container 500 is placed on top of the base 20 by coupling the circular mount 710 with the second motor impeller 230, the inner circular wall 530 of the processor container 500 fits over the circular retaining wall 240 of the base 20, such that the keys 550 are substantially aligned with the brackets 242. The processor container 500 is rotated to slide each key 550 into each bracket 242. When the processor container 500 is properly rotated to slide the keys 550 into the brackets 242, the processor container 500 is securely attached to the base 20.

Referring now to FIGS. 20 to 22, a preferred embodiment of the food processor configuration has two food-processor-configuration safety mechanisms. The food processor mechanisms function to ensure that the lid 610 is securely attached to the processor container 500, and the processor container 500 is securely attached to the base 20 before the motor can be turned on to perform processing operations. The food-processor-configuration safety mechanisms are now described.

To actuate the retractable switches 262 in the food processor configuration, it is necessary to assemble the lid 610 securely to the processor container 500 to form the food processor assembly 110, then mount the food processor assembly 110 securely to the base 20. Both steps are required to enable the motor to be turned on.

When the lid 610 is assembled to the processor container 500 and rotated to engage the locking protrusions 520 with the indents 620 as shown in FIGS. 20 and 21, the overhang mechanism 630 that is located on the rim 618 of the cover 614 rotates to enter the gap 576 at the top portion 572 the handle backbone 570.

Referring to FIGS. 22 and 23, the overhang mechanism 630 contacts the lever-top-end 812 of the handle lever 810 to push the handle lever 810 downward. This causes the tab 824 to extend out of the first bottom opening 826. The tab 824 is located such that it aligns with the retractable switches 262 when the processor container 500 is mounted on the base 20.

As such, when the processor container 500 is mounted to the base 20 by rotating the processor container 500 to engage the keys 550 with the brackets 242, the tab 824 in its extended position will enter a first interlock 250 on the base 20 to engage a first retractable switch 262. The extended tab 824 pushes the first retractable switch 262 into the retracted position as shown in FIG. 22. Thus, if the lid 610 is not on the processor container 500 or not securely assembled to the processor container 500, the tab 824 is not extended, and therefore, it does not depress the first retractable switch 262.

As described above, in an embodiment the base 20 has at least two retractable switches 262, both of which must be in the retracted position for the motor to be started by the controls 216. When the processor container 500 is mounted to the base 20 by rotating the processor container 500 to engage the keys 550 with the brackets 242, the fin 560 enter the second interlock 250 to engage the second retractable switch 262.

This ensures that the food processor assembly 110 is securely assembled to the base 20 for the motor to operate. If the processor container 500 is assembled to the base 20 without the lid 610, the fin 560 only depresses one of the two retractable switches 262 and therefore the motor cannot be started. The lid 610 must be securely attached to the processor container 500 to depress both retractable switches 262. Thus, if the lid 610 becomes detached from the processor container 500 while the motor is in operation, the first retractable switch 262 returns to its default position to cut off the motor.

Further, when the processor container 500 is rotated counterclockwise to be dismounted from the base 20, the retractable switches 262 are disengaged, and the motor is shut off.

In this way, the appliance 100 according to an embodiment of the food processor configuration is made safe because it can only be operated when the lid 610 is securely attached to the processor container 500, and the food processor assembly 110 is securely mounted to the base 20.

While illustrative embodiments of the invention have been described in detail above, it is to be understood that the appended claims are intended to be construed to include variations of the present invention.

I claim:

1. An appliance operable in a first configuration and a second configuration, said appliance comprising:

a blender assembly for use in said first configuration, said
blender assembly comprising:
a first container;
a blade attachment;
said blade attachment attachable to said first container;
said blade attachment having a first movable tab;
wherein, when said blade attachment is attached to said first container, said first container causes said first movable tab to move from a first tab position to a second tab position;
a processor assembly for use in said second configuration, said processor assembly comprising:
a second container;
said second container having a movable lever;
a lid;
said lid attachable to said second container;
wherein, when said lid is attached to said second container, said lid causes said movable lever to move from a first lever position to a second lever position;
a base, said base said base configured to mount said blender assembly in said first configuration or said processor assembly in said second configuration, said base comprising:
a motor for operating said appliance;
a first safety switch associated with said motor, such that said motor is only operable when said first safety switch is actuated;
wherein,
in said first configuration, said first safety switch is actuated by said first movable tab when said first movable tab is in said second tab position;
in said second configuration, said first safety switch is actuated by said movable lever when said movable lever is in said second lever position.

2. The appliance of claim 1, wherein said base further comprises a second safety switch.

3. The appliance of claim 2 in said first configuration, wherein:
said blade attachment further comprises a second movable tab;
wherein, when said blade attachment is attached to said container, said container causes:
said first movable tab to move from a first tab position to a second tab position; and,
said second movable tab to move from a first tab position to a second tab position;
wherein:
said first movable tab actuates said first safety switch when said first movable tab is in said second tab position; and,
said second movable tab actuates said second safety switch when said second movable tab is in said second tab position.

4. The appliance of claim 2 in said second configuration, wherein:
said second container further comprises a fixed tab;
wherein, when said processor assembly is mounted to said base:
said movable lever actuates said first safety switch when said movable lever is in said second lever position; and,
said fixed tab actuates said second safety switch.

5. The appliance of claim 4, further comprising:
said lid having a protrusion;
said protrusion contacts said movable lever when said lid is attached to said second container, causing said movable lever to move from a first lever position to a second lever position to actuate said first safety switch.

6. The appliance of claim 4, further comprising:
said second container having a handle;
said movable lever is mounted to said handle.

7. The appliance of claim 6, further comprising:
said handle having a spring;
said movable lever is mounted to said spring;
wherein, said movable lever is in said first lever position when spring is uncompressed, and said movable lever is in said second lever position when spring is compressed.

8. The appliance of claim 1, wherein said base further comprises:
a first impeller, said first impeller connected to said motor;
a second impeller, said second impeller connected to said motor;
wherein, said motor operates said first impeller and said second impeller.

9. The appliance of claim 8, wherein said blade assembly further comprises:
a blade assembly impeller for coupling with said first impeller on said base;
said blade assembly impeller connected to a blade;
wherein, when said motor operates said first impeller, said first impeller drives said blade assembly impeller to spin said blade.

10. The appliance of claim 8, wherein said processor assembly further comprises:
a processor assembly impeller for coupling with said second impeller on said base;
said processor assembly impeller connected to a blade;
wherein, when said motor operates said second impeller, said second impeller drives said processor assembly impeller to spin said blade.

11. An appliance comprising:
a container;
a blade attachment;
said blade attachment attachable to said container;
said blade attachment having a first movable tab and a second movable tab;
wherein, when said blade attachment is attached to container, said container causes:
said first movable tab to move from a first tab position to a second tab position; and,
said second movable tab to move from a first tab position to a second tab position;
a base, said base comprising:
a motor for operating said appliance;
a first safety switch associated with said motor;
a second safety switch associated with said motor;
wherein said motor is only operable when both said first safety switch and said second safety switch are actuated;
wherein:
said first movable tab actuates said first safety switch when said first movable tab is in said second tab position; and,
said second movable tab actuates said second safety switch when said second movable tab is in said second tab position.

12. The appliance of claim 11, wherein:
said container has an open end and container threads wrapped around said open end;
said blade attachment further having:
a wall having blade assembly threads corresponding to said container threads;

said first movable tab located at a first location in said wall;
said second movable tab located at a second location in said wall;
wherein, when said blade attachment is attached to said container,
said container threads contact said first movable tab to cause said first movable tab to move from said first tab position to said second tab position to actuate said first safety switch; and,
said container threads contact said second movable tab to cause said second movable tab to move from said first tab position to said second tab position to actuate said second safety switch;
wherein, when either said first safety switch or said second safety switch is not actuated, said motor is not operable.

13. An appliance comprising:
a container;
said container having a handle;
said handle having a movable lever;
said movable lever movable between a first lever position and a second lever position;
a lid;
said lid attachable to said container, said lid having a protrusion;
said protrusion contacts said movable lever when said lid is attached to said container, causing said movable lever to move from said first lever position to said second lever position;
wherein, when said lid is attached to said container, said protrusion of said lid contacts said movable lever;
said lid further having a cover and a side wall,
said side wall having at least one indent;
a chute located on said cover for inserting comestible matter into said container;
said container having at least one locking protrusion, which engages said at least one indent when said lid is assembled to said container;
wherein said protrusion of said lid contacts said movable lever simultaneously as said least one locking protrusion engages said at least one indent when said lid is assembled to said container;
a base, said base comprising:
a motor for operating said appliance;
a first safety switch, wherein said motor is only operable when said first safety switch is actuated;
wherein said first safety switch is actuated by said movable lever when said movable lever is in said second lever position.

* * * * *